UNITED STATES PATENT OFFICE 2,190,829

PHENOL CARBOXYLIC ACID AMIDE-FORMALDEHYDE RESINS

George De Witt Graves, Wilmington, Del., assignor to E. I. du Pont de Nemours & Company, Wilmington, Del., a corporation of Delaware No Drawing. Application August 4, 1936, Serial No. 94,283

15 Claims. (Cl. 260—51)

This invention relates to synthetic resins and more particularly to a new type of phenol-formaldehyde condensation product.

Phenol-formaldehyde condensation products are in general dark resinous materials which are readily converted to the insoluble, infusible state. Because of these properties, they have found extensive use in molding. Their dark color, low solubility, poor compatibility characteristics, and poor adhesion to steel, wood, etc. have, however, limited their application. Various methods have been proposed for improving their properties, particularly with the idea of producing readily soluble products of good adhesion which could be used in coating compositions and the like.

Nitrogen-containing phenol-formaldehyde resins are known but these resins differ from the products herein described in composition and properties. They are made from different reactants and/or under different conditions of temperature, proportions of reactants, etc., than the products herein described. Unlike the products of the present invention, they are relatively insoluble and change to the infusible state very readily.

This invention has as an object the preparation of new and useful condensation products. Another object is the preparation of phenol-formaldehyde resins of improved properties. A still further object is to form products useful in the textile, plastic molding, coating, sizing, adhesive, impregnating, and related arts. Other objects will appear hereinafter.

These objects are accomplished by reacting a phenol containing an amide-forming group with a complementary amide-forming reactant and formaldehyde until a resinous product is obtained. As will be understood, the amide-forming group contained in the phenol and complementary amide-forming reactant is by definition an amino or an acid group. The term "phenol containing an amide-forming group" refers to both phenols and phenol ethers which contain an amino or acid group, such as carboxyl, amide, ester, or anhydride. The "complementary amide-forming reactant" of a phenol containing an amide-forming group is a compound which will react with the amide-forming group in the phenol to form an amide. Thus, when the amide-forming group contained in the phenol is an acid group, as for example in the case of salicylic acid, the complementary amide-forming reactant is an amine represented by hexamethylenediamine in the equation:

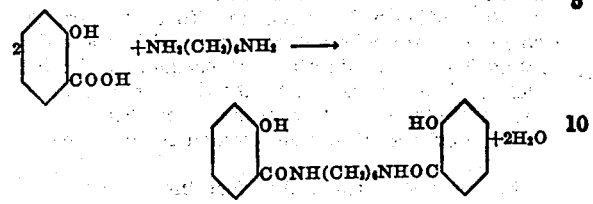

On the other hand, when the amide-forming group contained in the phenol is an amino group, as in the case of p-amino phenol, the complementary amide-forming reactant is an acid, such as adipic acid, and forms a phenol amide which is capable of reacting with formaldehyde. In the preparation of the products of this invention, ordinary phenols, e. g., phenol, cresol, xylenol, naphthol, hydroxydiphenyl, bis-(4-hydroxyphenyl)dimethymethane, etc., may be used in conjunction with the phenol containing the amide-forming group.

The products of this invention are made, as indicated above, by condensing a phenol containing an amide-forming group with a complementary amide-forming reactant and formaldehyde under conditions which give a resinous product. Preferably the phenolic constituent, i. e., the phenol acid or phenol amine, and the complementary amide-forming reactant are reacted together first and the resultant product then condensed with an aldehyde, preferably formaldehyde or a derivative capable of yielding formaldehyde, such as trioxymethylene, paraformaldehyde, and hexamethylenetetramine. This order of reacting the various components is preferable because it results in a more homogeneous and more readily soluble product. These desirable properties of my new resins may be due to the fact that the amide-forming reaction requires a relatively high temperature as compared with the phenol-formaldehyde reaction. If the phenol and formaldehyde are reacted first, the temperature required to convert the product into an amid is sufficiently high to cause a portion of the phenol-formaldehyde product to become insoluble and infusible before it has a chance to react with the complementry amide-forming reactant.

In the preferred practice of my invention the complementary amide-forming reactant is polyfunctional. The term "polyfunctional amide-forming reactant" embraces bifunctional derivatives, such as diamines having at least one hydrogen atom attached to each nitrogen atom and preferably di-primary diamines, dicarboxylic acids, and amide-forming derivatives of dibasic carboxylic acids, e. g. the ester, amide, or anhydride, as well as compounds having more than two functional groups, such as diethylenetriamine, triethylenetetramine, and tricarballylic acid. Products formed with the use of bifunctional amide-forming reactants are in general preferred; they are tougher and have better compatibility characteristics than those obtained with the use of a monofunctional amide-forming reactant and have better solubilities characteristics than those obtained with higher functional derivatives. While the complementary amide-forming reactant and the phenol can be used in various proportions, it is generally desirable to use them in such proportions that all the amide-forming groups react, in other words, in such proportions that the ratio of amine to acid groups is 1:1. Thus, when using salicylic acid (one acid group) and a diamine (two amino groups) the preferred molar ratio is 2:1. Mixed resins can be obtained by using more than the equivalent amount of the amide-forming phenol. Example I is illustrative of such a case. In this example two mols of salicylic acid are used with approximately 0.5 mol of diamine. Subsequently, formaldehyde is added to react with the phenol amide (decamethylene disalicylamide) and the unreacted salicylic acid to give a mixed resin or interpolymer.

The reaction of the amide-forming phenol, i. e., the phenol acid or phenol amine, with the complementary amide-forming reactant involves as a first step the preparation of a phenol amide. The preformed phenol amide may be used initially as in Example III, given below, in which case the first step is unnecessary. The phenol amide is obtained by heating a phenol containing an amide-forming group with a complementary amide-forming reactant under conditions which permit amide formation. The temperature required for this purpose differs somewhat with the nature of the reactants, but in general it is in the neighborhood of 150–250° C. Other temperatures may, however, be used with some success. The first reaction which occurs in the preparation of the phenol amide, e. g., from a phenol acid and a diamine, is the formation of the diamine-phenol acid salt. This salt is usually crystalline and can be purified by crystallization from a suitable solvent. On heating, the salt decomposes (generally above 150° C.) with the formation of the phenol amide and the liberation of water. If an ester, and particularly an aryl ester, is used in the preparation of the phenol amide in place of the free acid, the reaction often takes place quite readily at temperatures below 150° C. The reaction between a phenol containing an amide-forming group and a complementary amide-forming reactant can be carried out in the absence of a solvent (fusion method), in the presence of an inert solvent, in the presence of an inert non-solvent or diluent, or in the presence of a mixture of solvent and non-solvent. The reaction is conveniently carried out at ordinary pressures but increased or decreased pressure may be used. Exclusion of air from the reaction mixture is desirable, since this aids in the formation of light colored products. A suitable method for excluding air consists in passing nitrogen into the mixture throughout the reaction.

The phenol amides formed by the reaction just described may be monomeric or polymeric. They vary in properties from liquids to solids depending upon the reactants used in their preparation. Some are resinous. For the most part they are soluble in such substances as phenols, acids (e. g., formic and acetic acids), water, and water-alcohol mixtures. A common property of these products is their ability to react with formaldehyde. On hydrolysis with strong mineral acids the phenol amides regenerate the reactants from which they were derived, the amine constituent being obtained in the form of the salt with the mineral acid.

The second step in the preparation of the products of this invention according to the preferred procedure consists in reacting the phenol amide with formaldehyde or a product capable of yielding formaldehyde under the conditions of the reaction. This resin-forming reaction can be carried out in the presence or in the absence of a solvent or diluent. The reaction can be effected quite readily using aqueous solutions of formaldehyde. The temperature required differs with the nature of the reactants used, but temperatures in the neighborhood of 50–150° C. are generally most suitable. Catalysts of the acid, alkaline, or neutral type, such as are used in phenol-aldehyde reactions, may be used.

The proportions in which the phenol amide and formaldehyde are used may be varied within wide limits, depending on the complexity of the phenol amide and the degree of polymerization desired in the final resin. It is usually preferred to use at least one-half mol of formaldehyde for each mol of phenolic constituent in the resin. However, if a phenol-amide resin of relatively high molecular weight (Example V) is treated with formaldehyde, only a very small proportion of aldehyde (0.05–0.5 mol) per mol of phenolic constituent will induce further polymerization with a rapid increase in molecular weight and decrease in solubility of the resin. An excess of formaldehyde will completely insolubilize the product.

The phenol acid, phenol amine, or phenol amide may be employed in conjunction with a simple phenol such as phenol itself, cresols, cresylic acid, xylenols, hydroxydiphenyl, etc., and treated with a complementary amide-forming derivative and formaldehyde as previously described. However, the phenol acid, phenol amine, or phenol amide must constitute at least 25% of the total phenol ingredients in order to obtain a significant improvement in the resin due to amide modification.

The following examples, in which the parts are by weight, illustrate the preparation and application of the products of this invention:

EXAMPLE I

*Polymer from salicylic acid, decamethylenediamine and hexamethylenetetramine*

A mixture of 27.6 parts of salicylic acid and 9.0 parts of decamethylenediamine was heated for three hours in a bath at 200° C. The resultant phenolic amide was then heated with 1.68 parts of finely powdered hexamethylenetetramine, which served to furnish formaldehyde. This gave a thin syrup which was not hardenable by heat. On heating for 15 minutes at 115-120° C. with an additional two parts of hexamethylenetetramine, a light amber-colored resin was formed which softened at about 25° C. and was soluble in acetone, ethanol and in benzene. Solutions of this phenol amide-formaldehyde resin yielded films which, on baking at 100° C., were glossy, quite hard, tough, and showed good adhesion to surfaces of glass, wood, and steel.

EXAMPLE II

*Polymer from salicylic acid, hexamethylenediamine, and hexamethylenetetramine*

One hundred and thirty-eight parts of salicylic acid and 58 parts of hexamethylenediamine were heated together for one hour at 20 mm. pressure in a bath at 190-200° C. Approximately 18 parts of hexamethylenetetramine was added to the resultant polynuclear phenol amide and the mixture heated 2.5 hours at 130-135° C. The product was then dissolved in 120 parts of ethanol and refluxed for six hours. The resultant phenol amide-aldehyde polymer gave films which upon baking were hard and tough and had good water resistance. The resin was compatible with nitrocellulose. On hydrolysis with mineral acids the resin yielded hexamethylenediamine in the form of the salt with the mineral acid.

EXAMPLE III

*Resin from acetyl-p-aminophenol and formaldehyde*

A mixture of 15.1 parts of acetyl-p-aminophenol, a phenol amide of formula p-CH$_3$CONHC$_6$H$_4$OH and 20 parts of a neutral 20% (by volume) formaldehyde solution was heated at 75° C. for six hours. An additional 50 parts of water was added and the solution was refluxed for six hours. Upon cooling, the viscous mass gelled to give a reddish brown, friable resin. This phenol amide-aldehyde polymer was soluble in water, but films cast from solutions thereof became insoluble on drying at room temperature.

EXAMPLE IV

*Resin from salicylacetic acid, decamethylenediamine, and formaldehyde*

A mixture of 19.6 parts of salicylacetic acid, an amide-forming phenolic ether of formula

O—HOOCC$_6$H$_4$OCH$_2$COOH and 17.2 parts of decamethylenediamine was heated for 1.5 hours in a bath at 220-225° C. The temperature was then lowered to 180-190° C. and one part of trioxymethylene added. The viscosity increased very rapidly at this temperature with the formation of a phenol-amide-formaldehyde resin. The product was tough and hard when cold. It was insoluble in the common lacquer solvents. If the reaction with formaldehyde (trioxymethylene) is carried out at lower temperatures, a soluble product is obtained.

EXAMPLE V

*Resin from diphenylolpropanediacetic acid, decamethylenediamine, and formaldehyde*

A mixture of three parts of trioxymethylene and 48 parts of the polyamide resin, prepared from equimolecular parts of diphenylolpropanediacetic acid and decamethylenediamine, was heated in a bath at 170-180° C. for one hour and at 200-210° C. for 0.5 hour. The phenolic ether amide-formaldehyde polymer formed was a light amber resin which softened at about 76° C. and was insoluble in the common solvents. This product is useful as a molding material. Soluble products are obtained if the reaction with formaldehyde (trioxymethylene) is carried out at lower temperatures, or if the proportion of formaldehyde to polyamide resin is decreased.

It is also possible, as shown by the following examples, to make resins useful for some purposes by first condensing the phenolic component with formaldehyde and then reacting the resultant product with a complementary amide-forming reactant.

EXAMPLE VI

*Resin from diphenylolpropanemonoacetic acid, formaldehyde, and diethylenetriamine*

Diphenylolpropanemonoacetic acid (28.6 parts, prepared by reacting diphenylolpropane with chloroacetic acid in an alkaline medium) was dissolved in a mixture of five parts of 37% formaldehyde and 50 parts of ethanol and heated one hour in a bath at 70° C. To this solution there was added 6.8 parts of diethylenetriamine, after which the solvent was distilled off and the residue heated at 210-215° C. for two hours. The hard and somewhat brittle resin which formed was dark amber in color and had a softening point of about 54° C. It was insoluble in water but soluble in ethanol-toluene mixtures and in the ethyl ether of ethylene glycol. This soluble and fusible resin was converted into an insoluble, infusible product by further heating with hexamethylenetetramine.

EXAMPLE VII

*Resin from methylenedisalicylic acid and decamethylenediamine*

A mixture of 29 parts of methylenedisalicylic acid

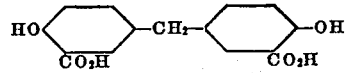

a condensation product of formaldehyde and salicylic acid, and 18 parts of decamethylenediamine was heated for five hours in a bath at 215-220° C. The phenol amide-aldehyde condensation product thus formed was a light amber-colored hard resin which softened at about 52° C. It was soluble in dioxan, ethers of ethylene glycol, ethanol-benzene mixtures, and in 10% aqueous sodium hydroxide solution.

Additional examples of amide-forming phenols and phenol ethers containing amino groups that may be mentioned are o-aminophenol, m-aminophenol, p-aminophenetole, aminonaphthols, and aminohydroxydiphenyls. Although bifunctional complementary amide-forming reactants are used with markedly better results in the practice of my invention, it is possible to obtain useful products through the use of monofunctional complementary amide-forming reactants. As suitable complementary amide-forming reactants for use with these aminophenols might be mentioned the following acids which may be used as such or in the form of their esters, anhydrides, or amides: acetic, propionic, stearic, oleic, benzoic, oxalic, maleic, fumaric, glutaric, adipic, sebacic, p-phenylene diacetic, glycolic, dithioglycolic, etc. Drying oil acids and amide-forming derivatives thereof may also be used. Further examples of amide-forming phenols (and phenol ethers) containing an acid group which may be used in preparing the products of this invention are the following phenolic acids: m-hydroxybenzoic, p-hydroxybenzoic, p-methoxybenzoic, m-ethoxybenzoic, 6-methyl-2-hydroxybenzoic, 2-methyl-3-hydroxybenzoic, 5-methyl-3-hydroxybenzoic, 2-methyl-4-hydroxybenzoic, peri-naphthol carboxylic (1-hydroxy-8-carboxynaphthalene), p-hydroxyphenyl-o-benzoic, 2-phenyl-3-hydroxybenzoic, as well as the esters, anhydrides, and amides of these acids. Suitable complementary amide-forming reactants for use with these phenol acids include methylamine, ethylamine, butylamine, cyclohexylamine, aniline, benzylamine, but preferably diamines such as ethylenediamine, tetramethylenediamine, hexamethylenediamine, decamethylenediamine, p-xylylenediamine, and 2,2-diaminodiethyl ether.

It is evident from the foregoing description that many combinations of reactants can be used for the preparation of the modified phenol-formaldehyde resins covered by this invention. In addition to varying the reactants, it is possible to vary the order in which the three reactants, i. e., amide-forming phenol, complementary amide-forming reactant, and formaldehyde, are reacted. Other aldehydes may be used in place of or in conjunction with formaldehyde. Further combinations are possible by using a mixture of amide-forming phenols and/or complementary amide-forming reactants. As already indicated, phenols which do not contain amide-forming groups may also be used in conjunction with the above reactants, but in order to obtain products having the desired solubility and compatibility, a substantial portion of the phenolic constituent (generally at least 25%) should be a phenol containing an amide-forming group. Moreover, it is within the scope of this invention to mix two or more of the phenol amide-formaldehyde resins. The products of this invention can also be mixed with other polymers, e. g., with the fiber-forming polyamides described in Patent No. 2,071,250. Thus, it is possible to add substantial amounts of a phenol amide-formaldehyde resin of the type herein described to a superpolyamide, e. g., polyhexamethylene adipamine, and obtain a product whose properties closely resemble that of the original superpolyamide; the mixed polymer can, for example, be spun from melt into useful fibers.

The phenol amide-formaldehyde condensation products of the present invention, particularly those formed by the two-step process described above, are for the most part resinous in character having softening temperatures and solubility characteristics which vary with the nature of the reactants used in their preparation. These products as initially formed are soluble in a wide variety of solvents, including esters, ketones, alcohols, hydroxy ethers, and aromatic hydrocarbons. The ethyl ether of ethylene glycol is in general an especially good solvent. On hydrolysis with strong mineral acids the products of this invention yield an amide-forming reactant, namely, the complementary amide-forming reactant used in the preparation of the resin. If this complementary amide-forming reactant is an amine it will be obtained in the form of the mineral acid salt. The resins usually have good compatibility characteristics and can be mixed with drying oils; cellulose derivatives, e. g., cellulose acetate, ethyl cellulose, benzyl cellulose, cellulose nitrate; natural resins; synthetic resins, e. g., polyhydric alcohol-polybasic acid resins, polyamides, and other types of phenol-formaldehyde resins; plasticizers; pigments; dyes; and other ingredients used in the preparation of coating and plastic compositions. These properties render the products especially useful in the preparation of coating, plastic, impregnating, adhesive, sizing, and related compositions. Although the products are, for the most part, readily soluble, they can usually be converted into the insoluble, infusible state by prolonged heating, but this change does not take place so readily as in the case of unmodified phenol-formaldehyde resins. The products yield continuous films which become hard and tough. Baking of these films hastens their conversion to the hard state.

As will be seen from the above description, the method described herein permits the preparation of modified phenol-formaldehyde resins of widely different properties. The process is especially useful in preparing light-colored, readily soluble resins. As previously mentioned, these products depending upon their properties are useful in the coating, plastic, molding, sizing, impregnating, adhesive, textile, and related arts. In the various applications the products may be mixed with one another or with other agents such as plasticizers, resins, cellulose derivatives, pigments, fillers, dyes, and the like.

As many apparently widely different embodiments of this invention may be made without departing from the spirit and scope thereof, it is to be understood that I do not limit myself to the specific embodiments thereof except as defined in the appended claims.

I claim:

1. The resinous reaction product of formaldehyde and an amide obtained by reacting an amino phenol with a compound of the class consisting of polycarboxylic acids and amide-forming derivatives thereof.

2. The resinous reaction product set forth in claim 1 in which said compound is a dicarboxylic acid.

3. The resinous reaction product of formaldehyde with a carboxylic acid amide obtained by reacting a phenol containing an amide-forming group with a complementary bifunctional amide-forming reactant capable of forming said carboxylic acid amide with said phenol.

4. The resinous reaction product of formaldehyde with a carboxylic acid amide obtained by reacting a phenol containing an amide-forming group with a complementary polyfunctional amide-forming reactant capable of forming said carboxylic acid amide with said phenol.

5. A formaldehyde-phenol amide resin yielding, upon hydrolysis with strong mineral acid, a bifunctional aliphatic amide-forming compound, the amide-forming group in said compound resulting from hydrolysis of carboxylic acid amide linkages in said resin.

6. A formaldehyde-phenol amide resin yielding, upon hydrolysis with strong mineral acid, a polyfunctional aliphatic amide-forming compound, the amide-forming group in said compound resulting from hydrolysis of carboxylic acid amide linkages in said resin.

7. A process for making resins which comprises reacting with heat treatment formaldehyde and a carboxylic acid amide obtained by reacting a phenol containing an amide-forming group with a complementary bifunctional amide-forming reactant capable of forming said carboxylic acid amide with said phenol.

8. A process for making resins which comprises reacting with heat treatment formaldehyde and a carboxylic acid amide obtained by reacting a phenol containing an amide-forming group with a complementary polyfunctional amide-forming reactant capable of forming said carboxylic acid amide with said phenol.

9. The process set forth in claim 7 in which the phenol is an amino phenol and in which the complementary amide-forming reactant is a dicarboxylic acid.

10. A process for making resins which comprises reacting a phenol carboxylic acid and a diamine thereby forming a diamine-phenol acid salt, heating said salt to convert it into an amide, and then heating the amide with formaldehyde.

11. The resinous reaction product of formaldehyde and an amide obtained by reacting a phenol carboxylic acid with a diamine.

12. The process set forth in claim 7 in which the phenol is a phenol carboxylic acid and in which the complementary amide-forming reactant is a diamine.

13. A process for making resins which comprises reacting an amino phenol with a dicarboxylic acid thereby forming a salt, heating said salt to convert it into an amide, and then heating the amide with formaldehyde.

14. The resinous reaction product set forth in claim 1 in which said compound is an amide-forming derivative of a dicarboxylic acid.

15. The process set forth in claim 7 in which the phenol is an amino phenol and in which the complementary amide-forming reactant is an amide-forming derivative of a dicarboxylic acid.

GEORGE DE WITT GRAVES.

CERTIFICATE OF CORRECTION.

Patent No. 2,190,829. February 20, 1940.

GEORGE DE WITT GRAVES.

It is hereby certified that error appears in the printed specification of the above numbered patent requiring correction as follows: Page 4, first column, line 16, for "2,2" read --2,2'--; and that the said Letters Patent should be read with this correction therein that the same may conform to the record of the case in the Patent Office.

Signed and sealed this 7th day of May, A. D. 1940.

(Seal)

Henry Van Arsdale,
Acting Commissioner of Patents.